(12) United States Patent
Musk

(10) Patent No.: US 6,440,776 B1
(45) Date of Patent: Aug. 27, 2002

(54) SECURING AN OPTICAL COMPONENT ONTO A MICRO BENCH

(75) Inventor: Robert W. Musk, Kingsbridge (GB)

(73) Assignee: JDS Uniphase Inc., Nepean (CA)

( * ) Notice: Subject to any disclaimer, the term of this patent is extended or adjusted under 35 U.S.C. 154(b) by 78 days.

(21) Appl. No.: 09/733,967

(22) Filed: Dec. 12, 2000

(51) Int. Cl.⁷ .................. H01L 21/44; H01L 21/48; H01L 21/50
(52) U.S. Cl. .......... 438/117; 438/118; 438/125; 65/36; 65/42; 65/43; 65/406; 65/392; 385/49; 385/88; 385/89; 156/196; 156/219; 156/272.2; 156/272.8; 156/273.9; 156/275.1; 156/290
(58) Field of Search ............... 438/117, 118, 438/125; 65/36, 42, 43, 406, 392; 156/196, 219, 272.2, 272.8, 273.9, 275.1, 290; 385/49, 88, 89

(56) References Cited

U.S. PATENT DOCUMENTS

| | | |
|---|---|---|
| 4,033,668 A | 7/1977 | Presby ................ 350/96 C |
| 4,357,072 A | 11/1982 | Goodfellow et al. ....... 350/96.2 |
| 4,788,406 A | 11/1988 | Holman et al. ............. 219/113 |
| 4,961,768 A | * 10/1990 | Djeu ............................ 65/4.21 |
| 5,173,959 A | 12/1992 | Cambriello .................. 385/89 |
| 5,367,140 A | 11/1994 | Jouaneh et al. ........ 219/121.64 |
| 5,389,193 A | 2/1995 | Coucoulas et al. ......... 156/633 |
| 5,533,158 A | 7/1996 | Han et al. ..................... 385/88 |
| 5,717,803 A | 2/1998 | Yoneda et al. ................ 385/89 |
| 5,937,132 A | 8/1999 | Labeye et al. ............. 385/137 |
| 5,961,849 A | 10/1999 | Bostock et al. ............... 216/24 |

FOREIGN PATENT DOCUMENTS

EP  0 635 737 A1  1/1995  ............ G02B/6/30

* cited by examiner

Primary Examiner—David L. Talbott
Assistant Examiner—David A. Zarneke
(74) Attorney, Agent, or Firm—Lacasse & Associates, LLC

(57) ABSTRACT

A method of attaching a component onto a microbench includes laying the component in a groove in the substrate, and locally deforming a portion of the groove, to thereby hold the component in the groove. Preferably, the microbench is a silicon substrate used for MEMs-type structures in the fiber optics industry. In particular, the method is used for securing an optical fiber in a groove, DRI etched from a silicon substrate, before or after the fiber is aligned with other optical components, i.e. lenses, lasers etc. The local deformation is done using a laser welding device selected to be effective in locally melting the substrate while leaving the component relatively undamaged.

19 Claims, 1 Drawing Sheet

SECURING AN OPTICAL COMPONENT ONTO A MICRO BENCH

FIELD OF INVENTION

The present invention relates to a device for securing a component on a substrate, and in particular to a device for securing an optical component, such as an optical fiber, in a groove etched in a silicon substrate.

BACKGROUND OF THE INVENTION

Recent demands in the fiber optics industry to increase durability and decrease cost have led to the use of microelectromechanical systems (MEMS) in key optical components. However, problems arise when other components are to be connected to the substrate. In particular, the positioning of optical fibers and lenses on the substrate has led to a variety of problems.

In the past these other components have been fixed to the substrate using epoxy resins. For example, U.S. Pat. No. 5,937,132 issued Aug. 10, 1999 in the name of Pierre Labeye et al discloses a process and a system for positioning and holding optical fibers in a groove using an adhesive material introduced therein. Unfortunately, there are several applications in which the use of epoxy resins is not acceptable, e.g. in 980 mn pump laser sources for fiber amplifiers, the use of organic materials such as epoxy resins is undesirable because of the damage to the laser facet.

Another method of fixing components to a substrate is to solder or weld a separate holder overtop of the fiber. U.S. Pat. No. 5,717,803, issued Feb. 10, 1998 in the name of Isao Yoneda et al, and U.S. Pat. No. 5,367,140, issued Nov. 22, 1994 to Musa Jouaneh et al disclose coupling methods utilizing a separate holder requiring welding or soldering to the substrate.

U.S. Pat. No. 4,788,406, issued Nov. 29, 1988 to Robert Holman et al, is indicative of another approach used to attach an optical fiber to a substrate. In this approach, a metallic sleeve is coated or mounted on the end of the fiber, so that the sleeve can be welded to a plate of similar material mounted on the substrate.

So far, the use of soldering or welding techniques to fix optical components to a substrate is quite labor intensive, requiring several additional steps to modify the elements, whereby they can be connected.

U.S. Pat. No. 5,961,849, issued Oct. 5, 1999 to Robert Bostock et al, discloses another mounting method, in which a MEMS device is used to hold down an optical fiber in a groove. This device is also relatively complicated to manufacture, requiring the deposition of a special layer onto the substrate. Moreover, many MEMS devices require power to operate.

SUMMARY OF THE INVENTION

It is an object of the present invention to avoid the shortcomings of the prior art by providing a relatively simple mounting device to hold an optical component on a substrate without the need for adhesives, solder, or complicated welding processes.

Accordingly, the present invention relates to a method of securing a component onto an substrate comprising the steps of:
positioning the component into a groove formed in the substrate; and
activating a laser of wavelength and power output capable of locally deforming a portion of one side of the groove for securing the component in the groove without substantially damaging the component.

BRIEF DESCRIPTION OF THE DRAWINGS

The invention will be described in greater detail with reference to the enclosed drawings which illustrate a preferred embodiment of the invention and wherein.

DETAILED DESCRIPTION OF THE INVENTION

Figure 1:
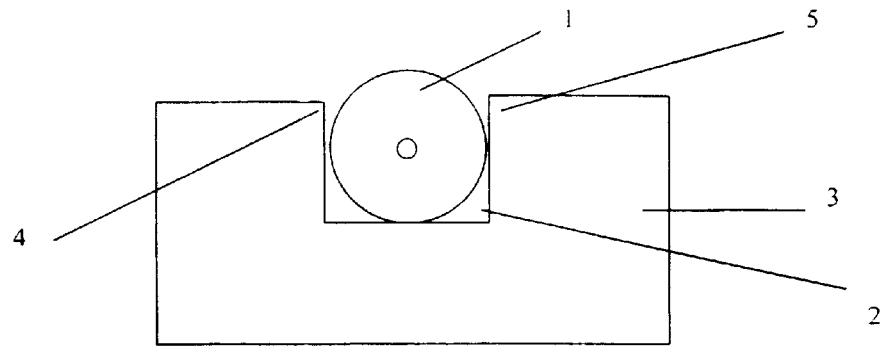
FIG. 1 is a cross-sectional view of an optical fiber in a groove in a substrate.

FIG. 1 illustrates an optical fiber 1 loosely positioned in a groove 2 formed in a substrate 3. Typically, the substrate 3 is silicon, and the groove 2 is etched therefrom using one of several, known etching processes. One process particularly suited for etching groove 2 is a deep reactive ion etching (DRIE) process. However, other substrate materials are possible, such as ceramic and GaAs.

Preferably, the sides 4 and 5 of the groove 2 are vertical and spaced apart by a distance approximating the diameter of the fiber 1. Moreover, it is advantageous to construct the depth of groove 2 shallower than the diameter of the fiber, but higher than the radius of the fiber, for reasons that will become apparent later.

Figure 2:
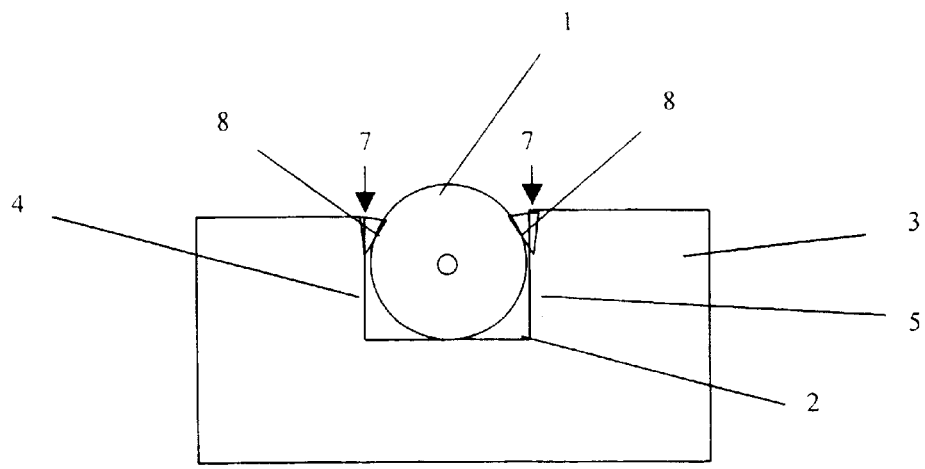
FIG. 2 is a cross-sectional view of the elements of FIG. 1 after being subjected to the securing method of the present invention.
Figure 3:
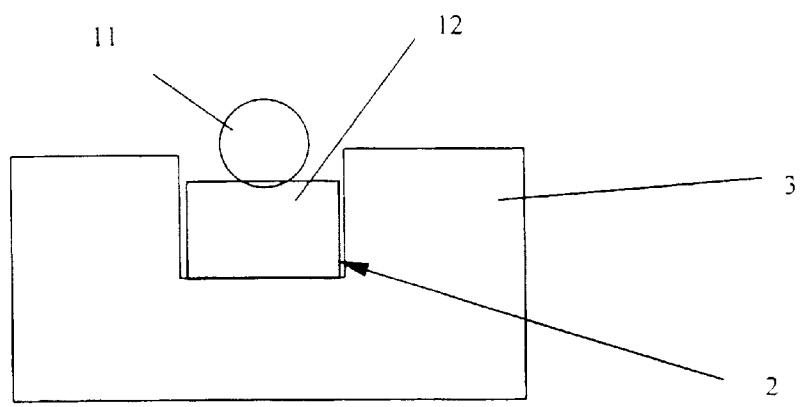
FIG. 3 is a cross-sectional view of an additional component placed in the groove prior to the optical fiber.

After the fiber 1 is placed in the groove 2, a laser (not shown) is activated, directing a beam 7 at upper portions of the sides 4 and 5 to create areas of localized melting 8, which deform around the fiber 1. By constructing the groove 2 according to the above-identified dimensions, the areas of localized melting 8 easily clamp down on the fiber as shown in FIG. 2. Obviously, other less optimum arrangements are possible, including melting an area 8 on only one side of the groove 2.

In a preferred embodiment, the wavelength and power of the laser beam 7 are selected to avoid any localized melting of the fiber 1, whereby a tight mechanical fit is created between the fiber 1 and the areas 8. In this arrangement, it may still be possible to slide the fiber 1 along the groove 2. Accordingly, wavelengths to which silica fibers are transparent are preferred. Suitable wavelengths include the ultraviolet up to a wavelength that is not transparent in silicon, i.e. approximately 1.2 microns. For several practical reasons, e.g. availability, cost, and power output, an Yttrium Aluminum Garnet (YAG) laser at a wavelength of 1.064 microns proves to be effective. The best results, in terms of melt depth, bead formation and particulate generation, have been observed with peak power densities in the range of from 5 to 20 $MW/cm^2$. If the wavelength and the power output of the laser are adjusted, it is possible to create an intimate mechanical bond between the fiber 1 and the areas 8 by locally deforming both the external surface of the fiber 1 and the upper portions of the sides 4 and 5.

In order to avoid oxidation of the silicon during welding, it is necessary to carry out the process in an inert atmosphere, e.g. argon. In practice, this may be accomplished by flushing the surface with a flow of argon or by performing the welding process in a sealed chamber.

Prior to fixing the fiber 1 in the groove 2, another component 11, such as a laser, a photodiode, a thermistor, or a lens, can be located therein. The other component can be fixed to the substrate using one of a variety of methods including adhesive, solder or the laser welding technique according to the present invention. Subsequently, the fiber 1 would be aligned with the component 11 using one of a variety of aligning techniques, and then fixed in the groove 2.

Alternatively, substrate 3 is a separate mounting substrate that the fiber 1 is initially fixed to, and the subsequent process involves: 1) mounting the component 11 on a main substrate; 2) aligning the fiber 1 with the component 11; and 3) fixing the mounting substrate to the main substrate. A third option has the other component 11, having a rectangular base 12, fixed in a correspondingly rectangular indentation using the laser welding technique according to the present invention.

We claim:

1. A method of securing a component onto an integrated circuit substrate comprising the steps of:
   a) positioning the component into a groove formed in the substrate; and
   b) directing at least one laser beam of wavelength and power capable of locally deforming a portion of one side of the groove for securing the component in the groove without substantially damaging the component.

2. The method according to claim 1, further comprising etching a groove out of the substrate prior to step a).

3. The method according to claim 2, wherein deep reactive ion etching is used to etch the groove out of the substrate.

4. The method according to claim 1, further comprising:
   c) optically aligning the component with another optical component on another substrate; and
   d) fixing the substrate to the other substrate with the components in optical alignment.

5. The method according to claim 4, wherein both of the substrates are silicon; and step d) includes laser welding the two substrates together.

6. The method according to claim 1, wherein each laser beam locally deforms a portion on each side of the groove.

7. The method according to claim 6, wherein the groove has substantially vertical sides.

8. The method according to claim 7, wherein the groove has a width substantially equal to the diameter of the component.

9. The method according to claim 8, wherein the groove has a height greater than the radius of the component, and less than the diameter of the component.

10. The method according to claim 9, wherein the deformed portions on each side of the groove are proximate an upper edge thereof.

11. The method according to claim 1, wherein each laser beam is capable of locally deforming a part of the component proximate the deformed portion of the side of the groove, whereby an intimate bond is formed therebetween.

12. The method according to claim 1, wherein the component is transparent to each laser beam.

13. The method according to claim 1, wherein the component is an optical fiber.

14. The method according to claim 1, wherein each laser beam has a peak power density in the range of 5 to 20 MW/cm$^2$.

15. The method according to claim 1, wherein each laser beam has a wavelength of up to 1.2 $\mu$m.

16. The method according to claim 1, wherein step b) is executed in an inert atmosphere.

17. The method according to claim 16, wherein the inert atmosphere comprises argon.

18. The method according to claim 1, further comprising flushing the substrate with a flow of inert gas.

19. The method according to claim 18, wherein the inert gas comprises argon.

* * * * *